United States Patent [19]
Okura et al.

[11] Patent Number: 5,902,858
[45] Date of Patent: May 11, 1999

[54] MODIFIED POLYPROPYLENE RESIN, FOAM MADE THEREOF AND PROCESSES FOR THE PREPARATION OF THEM

[75] Inventors: Tetsuo Okura, Ibaraki; Osamu Miyama, Settsu; Haruo Tomita, Kobe, all of Japan

[73] Assignee: Kaneka Corporation, Osaka, Japan

[21] Appl. No.: 08/981,628

[22] PCT Filed: Jan. 6, 1997

[86] PCT No.: PCT/JP97/00006

§ 371 Date: Dec. 12, 1997

§ 102(e) Date: Dec. 12, 1997

[87] PCT Pub. No.: WO97/25356

PCT Pub. Date: Jul. 17, 1997

[30] Foreign Application Priority Data

Jan. 10, 1996 [JP] Japan ................... 2599/1996
Jan. 10, 1996 [JP] Japan ................... 2600/1996

[51] Int. Cl.$^6$ ................................... C08F 255/06
[52] U.S. Cl. .................. 525/263; 521/82; 521/98; 521/134; 521/140; 521/150; 525/55; 525/64; 525/244; 525/260; 525/264; 525/313
[58] Field of Search ................... 521/82, 98, 134, 521/140, 150; 522/244, 260, 263, 55, 64, 264, 313

[56] References Cited

U.S. PATENT DOCUMENTS

| | | | |
|---|---|---|---|
| 2,556,158 | 9/1949 | West | 525/264 |
| 3,953,541 | 4/1976 | Fuji | 525/264 |
| 4,078,017 | 3/1978 | Nagatoshi et al. | 525/263 |
| 5,189,108 | 2/1993 | Imai et al. | 525/260 |
| 5,344,888 | 9/1994 | Wild et al. | 525/263 |
| 5,391,607 | 2/1995 | Fuji et al. | 525/64 |
| 5,541,262 | 7/1996 | Brichta et al. | 525/313 |
| 5,584,541 | 12/1996 | Kinoshita et al. | 525/64 |
| 5,616,627 | 4/1997 | Sakurai et al. | 521/134 |
| 5,665,820 | 9/1997 | Zeistner et al. | 525/64 |

Primary Examiner—John M. Cooney, Jr.
Attorney, Agent, or Firm—Armstrong, Westerman, Hattori, McLeland & Naughton

[57] ABSTRACT

A modified polypropylene resin obtained by melt-kneading a polypropylene resin, an isoprene monomer and a radical polymerization initiator, which has a high melt viscosity and a high melt tensile strengh and is hard to cause draw-down, and which provides, by foaming thereof, foamed articles having low density, high closed cell content, beautiful appearance and excellent heat resistance.

7 Claims, 2 Drawing Sheets

FIG. 1

MODIFIED POLYPROPYLENE RESIN, FOAM MADE THEREOF AND PROCESSES FOR THE PREPARATION OF THEM

TECHNICAL FIELD

The present invention relates to a modified polypropylene resin obtained by melt-kneading a polypropylene resin, an isoprene monomer and a radical polymerization initiator, a process for the preparation thereof, a foam made of the modified polypropylene resin and a process for the preparation thereof.

BACKGROUND ART

Polypropylene resins have various uses such as films, fibers and other molded articles of various shapes, since they are inexpensive and molded articles thereof are superior in rigidity, heat resistance, chemical resistance and electrical insulating property.

However, since conventional polypropylene resins are crystalline resins, the melt viscosity, particularly the elongational viscosity, is very low. Thus, they have the problem that in a process wherein a molten resin is remarkably deformed, e.g., blow molding, extrusion, and foaming, ranges of processing conditions capable of producing suitable molded articles are narrow.

As one of manners for solving such a problem in processability of polypropylene resins, physical blending of the polypropylene resins with polyethylene has been widely used. However, according to this manner, a large amount of polyethylene is required for sufficiently improving the processability, so the molded articles obtained from the thus improved resins result in low rigidity.

Another manner is to use a polypropylene resin having a high molecular weight. However, such a resin has the problem that in case of conducting extrusion, a load on an extruder becomes large because of high viscosity. Also, since the resin is difficult to largely deform in the molten state, blow molding thereof is difficult to provide molded articles in a high draw ratio and foaming thereof is difficult to provide foamed articles having a high expansion ratio.

Also, polypropylene resins are radical-degradable polymers. Therefore, in general, it is difficult to increase the molecular weight by crosslinking the polymer molecules, even if radical polymerization initiators capable of serving as an intermolecular crosslinking agent are used.

In order to solve these problems, it is proposed in Japanese Patent Publication Kokai No. 62-121704 to irradiate radiation to a semi-crystalline polypropylene resin having a linear molecular structure in a gas atmosphere having a controlled specific oxygen concentration, thereby raising the melt viscosity and melt tensile strength of the polypropylene resin. The Japanese publication discloses that the polypropylene resin modified in this manner has a structure such that the polymer molecule has long chain branches, and is suitable for molding methods such as blow molding, extrusion coating molding and the like.

It is also disclosed therein that the reason why the polypropylene resin modified in this manner is suitable for these molding methods is that the resin has the characteristics that the elongational viscosity measured in the molten state of this resin rapidly increases as the strain increases, that is to say, when this resin is subjected to tensile deformation in the molten state, the elongational viscosity increases with increasing the elongational strain and, after reaching a specific elongational strain, the elongational viscosity rapidly increases.

However, in case of modifying polypropylene in this manner, it is unavoidable that because of utilizing radiation, the apparatus to be used becomes large scale and complicated in structure. Also, in order to prevent degradation and gelation of polypropylene resins in the radiation exposure step so as to stably produce products, it is required to strictly control the radiation dose and the oxygen concentration of the surrounding gas. Further, because of necessity to strictly control the production conditions like this, it is not easy to give variety to the physical properties of the objective modified polypropylene resins.

Foamed articles made of polypropylene resins have good chemical resistance, impact resistance and heat resistance and, therefore, they have been suitably utilized as heat insulator, cushioning material, core material, food container and the like, particularly as cushioning material.

However, polypropylene resins are low in melt viscosity and melt tensile strength because of crystalline polymers as stated above and, therefore, in case of foaming the resins, the strength of cell wall is not sufficiently retained at the time of foaming. Also, the polypropylene resins are poor in gas barrier property and, therefore, a gas generated from a blowing agent is easy to escape from the cells to the outside when foaming the resins. For such reasons, it has been difficult to obtain foamed articles having an excellent appearance, a high closed cell content and a low density from polypropylene resins.

As a manner of improving the foamability of polypropylene resins, there are known, for example, a process wherein a crosslinking assistant is added to a polypropylene resin to crosslink the molecules thereof (see for example Japanese Patent Publication Kokoku No. 45-40420) and a process wherein a polypropylene resin is blended with polyethylene and is foamed (see for example Japanese Patent Publication Kokoku No. 44-2574).

However, the improvement of the foamability is not sufficient even if these processes are used.

Also, Japanese Patent Publication Kokai No. 4-3642 discloses a process wherein a propylene polymer and a non-conjugated diene are melt-blended to give a propylene-nonconjugated diene copolymer, and the copolymer is foamed. However, the Japanese publication does not disclose any process using isoprene.

Like this, it is the present situation that a process for preparing foamed articles having a high expansion ratio, a high closed cell content and a low density by sufficiently improving the foamability of a polypropylene resin and using the improved resin.

It is an object of the present invention to provide a modified polypropylene resin having a high melt viscosity, particularly a high elongational viscosity in the molten state, by a simple apparatus and in a simple manner.

A further object of the present invention is to provide a modified polypropylene resin which has the characteristics that the elongational viscosity thereof measured in the molten state rapidly increases as the amount of strain increases and which is excellent in extrusion moldability, foamability, blow moldability and vacuum moldability.

Another object of the present invention is to provide a foam which is made of a modified polypropylene resin having an improved foamability and which has an excellent heat resistance, a high expansion ratio, a high closed cell content, a low density and a beautiful appearance.

The present inventors have made an intensive study in order to solve the above-mentioned problems and have now found that a modified polypropylene resin obtained by melt-kneading a polypropylene resin, an isoprene monomer and a radical polymerization initiator has a melt viscosity not lowered in excess and favorable physical properties that the starting polypropylene resin originally possesses without being impaired, and has a high elongational viscosity at melting and accordingly has a drastically improved processability.

It has also been found that a modified polypropylene resin obtained by kneading a polypropylene resin, an isoprene monomer and a radical polymerization initiator at a temperature at which the polypropylene resin is molten and the radical polymerization initiator is degradable, has a remarkably improved foamability as compared with the starting polypropylene resin prior to the melt-kneading and has an excellent heat resistance, so it provides foamed articles having an excellent heat resistance, a high closed cell content, a low density and an excellent appearance by foaming it. Thus, the present inventors has accomplished the present invention.

DISCLOSURE OF THE INVENTION

The present invention provides a process for preparing a modified polypropylene resin which comprises melt-kneading a polypropylene resin, an isoprene monomer and a radical polymerization initiator.

The present invention also provides the modified polypropylene resin obtained by the above-mentioned process. The modified polypropylene resin of the present invention has the characteristics that the elongational viscosity thereof measured in the molten state rapidly increases with increasing the strain.

Further, the present invention provides a process for preparing a foamed article which comprises melt-kneading a polypropylene resin, an isoprene monomer and a radical polymerization initiator to give a modified polypropylene resin, and foaming the modified polypropylene resin. For example, the foamed article is prepared by melt-kneading the modified polypropylene resin and a blowing agent, and extruding the resin to thereby foam the resin.

The present invention also provides a foamed article prepared by the above process.

BEST MODE FOR CARRYING OUT THE INVENTION

The modified polypropylene resin of the present invention is obtained by melt-kneading a polypropylene resin, an isoprene monomer and a radical polymerization initiator. Since the melt viscosity, particularly the elongational viscosity in the molten state, is high, the modified polypropylene resin has a remarkably improved processability such that draw-down and other problems are hard to occur even if the modified polypropylene resin is subjected to molding methods wherein a molten resin is largely deformed.

Such a modified polypropylene resin of the present invention usually has the characteristics that the elongational viscosity measured in the molten state rapidly increases as the strain increases.

The above-mentioned molding methods wherein a molten resin is largely deformed include blow molding, extrusion coating, foaming, vacuum molding, pressure molding, and the like.

With respect to the characteristics in the present invention that the elongational viscosity measured in the molten state rapidly increases as the strain increases (hereinafter may be referred to as "specific elongational viscosity characteristic"), an explanation is given below.

This characteristic is evaluated, for example, by a method wherein a sample of a resin molding in the form of a strand having a diameter of about 3 mm is clamped at its both ends with rotary clamps, maintained at a temperature at which the sample is completely melted (for example, in the case of the modified polypropylene resin of the present invention, usually at about 180° C.) and elongated at a constant rate of strain, the stress generated between the clamps is measured with the lapse of time, and the elongational viscosity is calculated from the relationship between the stress and the cross-sectional area of the sample at the time when the stress is measured.

Namely, the elongational viscosity is represented by the equation (1):

$$\eta e = \frac{\sigma}{\dot{\gamma}} \qquad (1)$$

wherein $\eta e$ is an elongational viscosity (poise), $\sigma$ is a stress per cross-sectional area (dynes/cm$^2$), and $\dot{\gamma}$ is a strain rate (/sec) represented by the following equation:

$$\dot{\gamma} = \frac{1}{L} \cdot \frac{dL}{dt}$$

wherein L is a length of a sample (cm), and t is a time (second).

The elongational viscosity is plotted with the lapse of time. It can be said that in case that a resin shows a curve such that the elongational viscosity gradually increases with the lapse of time (as the strain increases) and the rate of increase in the elongational viscosity rapidly increases from a certain measuring time (at a certain strain value), the resin has the specific elongational viscosity characteristic.

Preferred are modified polypropylene resins such that in a curve showing the relationship between the measuring time and the elongational viscosity in which the abscissa represents a logarithm of the measuring time and the ordinate represents a logarithm of the elongational viscosity, the gradient ratio of a straight line drawn from the rapidly increasing portion of the elongational viscosity with the lapse of time to that drawn from the slowly increasing portion in the initial stage of the measurement is at least 1.2, especially at least 1.5. The upper limit of the gradient ratio is not restricted. According to the preparation process of the present invention, the modified polypropylene resins showing a gradient ratio of up to about 20 can be produced.

The gradients of the respective straight lines drawn from the above-mentioned curve are obtained from the following equation:

$$\Delta(\log \eta e)/\Delta(\log t)$$

wherein $\eta e$ is an elongational viscosity (poise), and t is a measuring time (second).

In the modified polypropylene resin having such a specific elongational viscosity characteristic, usually there is no measuring region where in the measurement of elongational viscosity, the elongational viscosity is decreased with the lapse of measuring time (with increasing the strain). The measuring sample is finally broken elastically like breaking of a rubber.

In contrast, in case of conventional linear polypropylene resins, the elongational viscosity generally increases with the lapse of measuring time (with increasing the strain), but rapid increase in elongational viscosity is scarcely observed. Also, in many cases, there is observed a phenomenon that the elongational viscosity decreases just before breaking of a measuring sample, and subsequently the sample is plastically broken.

Figure 1:
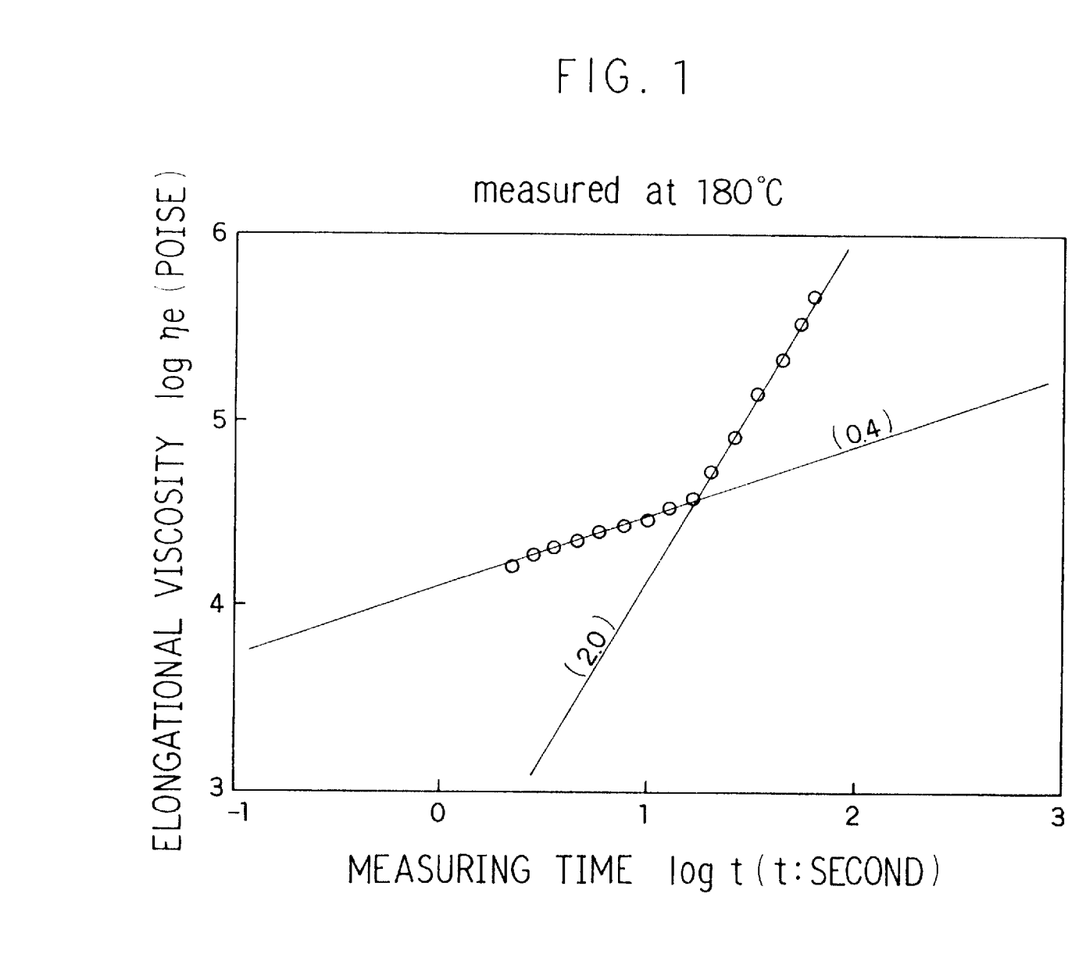
FIG. 1 is a graph showing a relationship between the elongational viscosity of the modified polypropylene resin prepared in Example 1 according to the present invention measured in the molten state and the measuring time (strain)

FIG. 1 shows a relationship between the elongational viscosity of a modified polypropylene resin obtained in Example 1 described after and the measuring time. This figure shows a relationship between the elongational viscosity (logarithm) and the measuring time (logarithm) in the case where the modified polypropylene resin is shaped into a columnar rod having a diameter of 3 mm and a length of 180 mm and the rod is stretched at a train rate of 0.05/sec at 180° C.

In FIG. 1, from the relationship between the gradient of the straight line drawn from the flat portion a portion where the elongational viscosity increases elatively slowly as the measuring time passes) in the initial stage of measurement in the curve and the gradient of the straight line drawn from the portion where the elongational viscosity increases most rapidly as the measuring time passes (respective gradients being shown in parentheses in FIG. 1), it is found that the elongational viscosity increases rapidly as the strain increases.

The measuring temperature is not limited to 180° C. and may be optionally selected from the temperature range of not less than the temperature at which a polypropylene resin substantially melts and less than the temperature at which the polypropylene resin starts thermal decomposition. It is usually preferable to set the measuring temperature within the range of 170° to 250° C. Also it is usually preferable to set the strain rate within the range of 0.01 to 0.5/sec.

If a resin indicates the specific elongational A viscosity characteristic at an optional point of the measuring condition within the above-mentioned measuring temperature range and the above-mentioned strain rate range, usually the specific characteristic can be recognized in the whole ranges of the measuring temperature and the strain rate.

The modified polypropylene resin of the present invention is obtained by melt-kneading a polypropylene resin (hereinafter may be referred to as "raw polypropylene resin"), an isoprene monomer and a radical polymerization initiator at a temperature at which the resin is molten.

Examples of the raw polypropylene resin are crystalline polymers such as propylene homopolymer, block copolymers of propylene and other monomers, random copolymers of propylene and other monomers, and the like. Propylene homopolymer is preferred from the viewpoints of having a high regidity and being inexpensive. The block copolymers of propylene and other monomers are peferred from the viewpoint that they are high in both rigidity and impact resistance. In case where the raw polypropylene resin is a block copolymer or random copolymer of propylene and other monomer, the content of the propylene monomer component is preferably not less than 75% by weight, more preferably not less than 90% by weight, on the basis of the whole weight in order to maintain high crystallinity, high rigidity and excellent chemical resistance which are features of polypropylene resins.

Examples of the monomer copolymerizable with propylene in the above-mentioned raw polypropylene resins are one or more monomers selected from the group consisting of ethylene, α-olefins, cyclic olefins, diene monomers and vinyl monomers. Ethylene, α-olefins or diene monomers are preferable because these monomers are easily copolymerizable with propylene and inexpensive.

Examples of the above-mentioned α-olefin copolymerizable with propylene are those having 4 to 12 carbon atoms, such as butene-1, isobutene, pentene-1, 3-methyl-butene-1, hexene-1, 3-methyl-pentene-1,4-methyl-pentene-1, 3,4-dimethyl-butene-1, heptene-1, 3-methyl-hexene-1, octene-1 and decene-1. Also, examples of the above-mentioned cyclic olefin copolymerizable with propylene are, for instance, cyclopentene, norbornene, 1,4,5,8-dimetano-1,2,3,4,4a,8, 8a-6-octahydronaphthalene and the like. Examples of the above-mentioned diene monomer copolymerizable with propylene are, for instance, 5-methylene-2-norbornene, 5-ethylidene-2-norbornene, 1,4-hexadiene, methyl-1,4-hexadiene, 7-methyl-1,6-octadiene and the like. Examples of the above-mentioned vinyl monomer copolymerizable with propylene are, for instance, vinyl chloride, vinylidene chloride, acrylonitrile, vinyl acetate, acrylic acid, methacrylic acid, maleic acid, ethyl acrylate, butyl acrylate, methyl methacrylate, maleic anhydride, styrene, methylstyrene, divinylbenzene and the like.

Among the above-mentioned monomers, ethylene or butene-1 is more preferred because it is inexpensive.

The molecular weight (weight average molecular weight) of the raw polypropylene resins is preferably from 50,000 to 2,000,000 from the viewpoint that the resins are industrially available with ease, and more preferably from 100,000 to 1,000,000 from the viewpoint of being inexpensive.

Other resins or rubbers may be added to the raw polypropylene resin, as occasion demands, so long as the effects of the present invention are not impaired. Examples of the other resins and rubbers are, for instance, polyethylene; α-polyolefins such as polybutene-1, polyisobutene, polypentene-1 and polymethylpentene-1; ethylene/α-olefin copolymers or α-olefin/α-olefin copolymers such as ethylene/propylene copolymer having a propylene content of less than 75% by weight, ethylene/butene-1 copolymer and propylene/butene-1 copolymer having a propylene content of less than 75% by weight; ethylene/α-olefin/diene monomer copolymers or α-olefin/α-olefin/diene monomer copolymers such as ethylene/propylene/5-ethylidene-2-norbornene copolymer containing less than 75% by weight of propylene; ethylene/vinyl monomer copolymers or α-olefin/vinyl monomer copolymers such as ethylene/vinyl chloride copolymer, ethylene/vinylidene chloride copolymer, ethylene/acrylonitrile copolymer, ethylene/methacrylonitrile copolymer, ethylene/vinyl acetate copolymer, ethylene/acrylamide copolymer, ethylene/methacrylamide copolymer, ethylene/acrylic acid copolymer, ethylene/methacrylic acid copolymer, ethylene/maleic acid copolymer, ethylene/ethyl acrylate copolymer, ethylene/butyl acrylate copolymer, ethylene/methyl methacrylate copolymer, ethylene/maleic anhydride copolymer, ethylene/acrylic acid metal salt copolymer, ethylene/methacrylic acid metal salt copolymer, ethylene/styrene copolymer, ethylene/methylstyrene copolymer and ethylene/divinylbenzene copolymer; polydiene polymers such as polyisobutene, polybutadiene and polyisoprene; random copolymers of vinyl monomer and diene monomer such as styrene/butadiene random copolymer; block copolymers of vinyl monomer, diene monomer and vinyl monomer such as styrene/butadiene/styrene block copolymer; hydrogenated vinyl monomer/diene monomer random copolymers such as hydrogenated styrene/butadiene random copolymer; hydrogenated vinyl monomer/diene monomer/vinyl monomer block copolymers such as hydrogenated styrene/butadiene/styrene block copolymer; graft copolymers of vinyl monomer, diene monomer and vinyl monomer such as acrylonitrile/butadiene/styrene graft copolymer and methyl methacrylate/butadiene/styrene graft copolymer; vinyl homopolymers such as polyvinyl chloride, polyvinylidene chloride, polyacrylonitrile, polyvinyl acetate, polyethyl acrylate, polybutyl acrylate, polymethyl methacrylate and polystyrene; vinyl copolymers such as vinyl chloride/acrylonitrile copolymer, vinyl chloride/vinyl acetate copolymer, acrylonitrile/styrene copolymer and methyl methacrylate/styrene copolymer; and the like.

The amount of these other resins or rubbers based on the raw polypropylene resin varies depending on the kinds of these resins or rubbers and, as mentioned above, may be within the range not impairing the effects of the present invention. In general, it is preferable that the amount is not more than about 25% by weight.

To the raw polypropylene resin may be added, if necessary, stabilizers such as antioxidant, metal deactivator, phosphorus type processing stabilizer, ultraviolet ray absorber, ultraviolet ray stabilizer, fluorescent whitening agent, metal soap and antacid adsorbent, or additives such as crosslinking agent, chain transfer agent, nucleating agent, lubricant, plasticizer, filler, reinforcing agent, pigment, dye, flame retarder and antistatic agent in an amount not impairing the effects of the present invention.

The raw polypropylene resins (which may contain various additive materials) may be in the form of particles or pellets, and the size and shape thereof are not particularly limited.

In case of using the above-mentioned additive materials (other resins, rubbers, stabilizers and/or additives), they may be added to the raw polypropylene resin previously or at the time of melting the raw resin, or may be added, after preparing a modified polypropylene resin, to this modified resin in a suitable manner.

The modified polypropylene resin of the present invention may be prepared by melt-kneading a polypropylene resin, an isoprene monomer, other vinyl monomers copolymerizable with the isoprene monomer, and a radical polymerization initiator.

Examples of the other vinyl monomers copolymerzable with the isoprene monomer are, for instance, vinyl chloride, vinylidene chloride, acrylonitrile, methacrylonitrile, acrylamide, methacrylamide, vinyl acetate, acrylic acid, methacrylic acid, maleic acid, maleic anhydride, an acyrlic acid metal salt, a methacrylic acid metal salt, an acrylic acid ester such as methyl acrylate, ethyl acrylate, butyl acrylate, 2-ethylhexyl acrylate, stearyl acrylate or glycyl acrylate, a methacyrlic acid ester such as methyl methacrylate, ethyl methacrylate, butyl methacrylate, 2-ethylhexyl methacylrate, stearyl methacrylate or glycyl methacrylate, and the like.

When the isoprene monomer is used in combination with other vinyl monomer copolymerizable therewith, it is preferable to use the other vinyl monomer in an amount of at most 100 parts by weight, especially at most 75 parts by weight, per 100 parts by weight of the isoprene monomer. If the amount of the other vinyl monomer exceeds the above range, there is a case where in molding the resulting modified polypropylene resin by extruding into a strand thereof, no good strand is formed, thus suitable pellets cannot be obtained. Further, there is a tendency that no foamed article having good shape and appearance is obtained.

The amount of the isoprene monomer to be subjected to the melt-kneading (if the isoprene monomer and the other vinyl monomer copolymerizable therewith are used in combination, the total amount thereof) is preferably from 0.1 to 100 parts by weight, more preferably from 1 to 50 parts by weight, per 100 parts by weight of the raw polypropylene resin. If the amount of the monomer is less than the above range, there is a case where the objective modified polypropylene resin does not have the specific elongational viscosity characteristic. If the amount of the monomer is more than the above range, the characteristics of polypropylene resins such as heat resistance, chemical resistance and mechanical property (rigidity) tend to be impaired.

Peroxides or azo compounds are generally used as the above-mentioned radical polymerization initiator. Radical polymerization initiators which have a hydrogen abstraction ability on polymer molecules of polypropylene resins are preferred in the present invention. Examples of the radical polymerization initiator are organic peroxides, for instance, a ketone peroxide such as methyl ethyl ketone peroxide or methyl acetoacetate peroxide; a peroxyketal such as 1,1-bis(t-butylperoxy)-3,3,5-trimethylcyclohexane, 1,1-bis(t-butylperoxy) cyclohexane, n-butyl-4,4-bis(t-butylperoxy) valerate or 2,2-bis(t-butylperoxy)butane; a hydroperoxide such as permethane hydroperoxide, 1,1,3,3-tetramethylbutyl hydroperoxide, di-isopropylbenzene hydroperoxide or cumene hydroperoxide; a dialkyl peroxide such as dicumyl peroxide, 2,5-dimethyl-2,5-di(t-butylperoxy) hexane, $\alpha,\alpha$-bis(t-butylperoxy-m-isopropyl)-benzene, t-butylcumyl peroxide, di-t-butyl peroxide or 2,5-dimethyl-2,5-di(t-butylperoxy)hexane-3; a diacyl peroxide such as benzoyl peroxide; a peroxydicarbonate such as di(3-methyl-3-methoxybutyl) peroxydicarbonate or di-2-methoxybutyl peroxydicarbonate; a peroxyester such as t-butyl peroxyoctate, t-butyl peroxyisobutylate, t-butyl peroxylaurate, t-butyl peroxy-3,5,5-trimethyl-hexanoate, t-butyl peroxyisopropylcarbonate, 2-5-dimethyl-2,5-di (benzoylperoxy)hexane, t-butyl peroxyacetate, t-butyl peroxybenzoate or di-t-butyl peroxyisophthalate; and the like. These organic peroxides may be used alone or in admixture thereof. Among them, those having a high ability of abstracting hydrogen are particularly preferable. Examples of such radical polymerization initiators are, for instance, a peroxyketal such as 1,1-bis(t-butylperoxy)-3,3,5-trimethylcyclohexane, 1,1-bis(t-butylperoxy)-cyclohexane, n-butyl-4,4-bis(t-butylperoxy)-valerate or 2,2-bis(t-butylperoxy)butane; a dialkyl peroxide such as dicumyl peroxide, 2,5-dimethyl-2,5-di(t-butylperoxy)-hexane, $\alpha,\alpha$-bis(t-butylperoxy-m-isopropyl)benzene, t-butylcumyl peroxide, di-t-butyl peroxide or 2,5-dimethyl-2,5-di(t-butylperoxy)hexane-3; a diacyl peroxide such as benzoyl peroxide; a peroxyester such as t-butyl peroxyoctate, t-butyl peroxyisobutylate, t-butyl peroxylaurate, t-butyl peroxy-3, 5,5-trimethylhexanoate, t-butyl peroxyisopropylcarbonate, 2-5-dimethyl-2,5-di(benzoylperoxy)hexane, t-butyl peroxyacetate, t-butyl peroxybenzoate or di-t-butyl peroxyisophthalate; and the like, which may be used alone or in admixture thereof.

The amount of the above-mentioned radical polymerization initiator is preferably within the range of 0.1 to 10 parts by weight, more preferably 0.5 to 5 parts by weight, per 100 parts by weight of the raw polypropylene resin from the viewpoint that the modified polypropylene resin is easy to be elastically deformed greatly and from an economical point of view. If the amount of the radical polymerization initiator is less than the above range, there is a tendency that the modification effect is not sufficiently obtained, and if the amount is more than the above range, there is a tendency that foamed articles having good shape and appearance are not obtained.

The order and manner of mixing and melt-kneading these raw polypropylene resin, isoprene monomer, radical polymerization initiator and other materials are not specifically limited. For example, the raw polypropylene resin, isoprene monomer, radical polymerization initiator and other optionally used additive materials may be firstly mixed and then melt-kneaded, or after melt-kneading only the raw polypropylene resin, the isoprene monomer, radical polymerization initiator and optionally used other additive materials may be mixed and melt-kneaded with the melt-kneaded resin simultaneously or separately and at once or by portions.

Though the heating temperature in the melt-kneading varies depending on the kind of resin and the like, it is preferable that the heating temperature is usually from 130 to 400° C. from the points that the raw polypropylene resin is melted sufficiently and is not thermally decomposed and that a sufficient elongational viscosity characteristic can be obtained. Also, the melt-kneading time (a time after the radical polymerization initiator and isoprene monomer have been mixed) is generally from 30 seconds to 60 minutes.

As apparatuses for the melt-kneading are used those capable of heating high molecular materials to a proper temperature and of kneading them with applying a proper shear stress, for example, a kneader such as roll, co-kneader, Banbury mixer, Brabender, single-screw extruder or twin-screw extruder, a horizontal type stirrer such as twin-screw surface modifying equipment or twin-screw multi-disc equipment, and a vertical type stirrer such as double helical ribbon blender. Among them, single-screw extruder and twin-screw extruder are preferred from the productivity point of view. Also, the melt-kneading procedure may be repeated plural times in order to mix the respective materials homogeneously.

The modified polypropylene resin of the present invention is suitably applicable to molding methods wherein a resin in the molten state is greatly deformed, e.g., blow molding, extrusion coating, foaming, vacuum molding and pressure molding.

The foamed articles of the present invention are obtained by foaming the modified polypropylene resins obtained in a manner as mentioned above.

The foamed articles of the present invention can be prepared, for example, (1) a process comprising melt-kneading the modified polypropylene resin with a blowing agent in a melt extruder, and extruding the resin from the extruder to give foamed articles, and (2) a process comprising adding or adding under pressure a blowing agent to the modified polypropylene resin in the molten state, and extruding the resin from a melt extruder.

In case of the process (1), thermally decomposable blowing agents and the like are used as the blowing agent. Preferable examples of the thermally decomposable blowing agent are, for instance, a nitroso blowing agent such as N,N'-dinitrosopentamethylene tetramine or N,N'-dimethyl-N,N'-dinitrosoterephthalamide; an azo blowing agent such as azodicarbonamide or barium azodicarboxylate; a sulfohydrazide blowing agent such as p,p-oxybisbenzene sulfonyl hydrazide or p-toluene sulfonyl semicarbazide; trihydrazinotriazine; and the like, which may be used alone or in admixture thereof.

The amount of the above-mentioned blowing agent to be added is suitably selected depending on the kind of the blowing agent and the desired expansion ratio, and is preferably within the range of 0.5 to 100 parts by weight per 100 parts by weight of the modified polypropylene resin.

Also, in order to properly control the cell diameter of foamed articles, a nucleating agent for the foaming such as sodium bicarbonate-citric acid, talc or the like may be used, as occasion demands. The amount of the foaming nucleating agent used optionally is usually from 0.01 to 1 part by weight per 100 parts by weight of the modified polypropylene resin.

In case of process (1), the modified polypropylene resin can be formed into foamed articles by supplying the modified polypropylene resin and the thermally decomposable blowing agent together into a melt extruder, melt-kneading at a proper temperature while decomposing the blowing agent to generate a gas, and discharging the molten modified polypropylene resin containing the gas out of a die. The melt-kneading temperature and time in this method are properly selected according to the kind of the blowing agent used and kneading conditions. The melt-kneading temperature and time, though varying depending on the kind of the resin, are usually from 130 to 400° C. and from 1 to 60 minutes, respectively.

In case of the process (2), volatile blowing agents are used as the blowing agent. Preferable examples of the volatile blowing agent are, for instance, an aliphatic hydrocarbon such as propane, butane, pentane, hexane or heptane; an alicyclic hydrocarbon such as cyclobutane, cyclopentane or cyclohexane; a halogenated hydrocarbon such as chlorodifluoromethane, difluoromethane, trifluoromethane, dichloromethane, dichlorofluoromethane, dichlorodifluoromethane, trichlorofluoromethane, chloromethane, chloroethane, dichlorotrifluoroethane, dichlorofluoroethane, chlorodifluoroethane, tetrafluoroethane, difluoroethane, pentafluoroethane, trifluoroethane, dichlorotetrafluoroethane, trichlorotrifluoroethane, tetrachlorodifluoroethane, chloropentafluoroethane or perfluorocyclobutane; an inorganic gas such as carbon dioxide, nitrogen or air; water; and the like, which may be used alone or in admixture thereof.

The amount of the volatile blowing agent varies depending on the kind of the blowing agent and the desired expansion ratio. It is preferable that the amount is within the range of 0.5 to 100 parts by weight per 100 parts by weight of the modified polypropylene resin.

In this process too, in order to control the cell size of foamed articles properly, a nucleating agent for the foaming such as sodium bicarbonate-citric acid, talc or the like may be used if necessary. The amount of the foaming nucleating agent is usually from 0.01 to 1 part by weight per 100 parts by weight of the modified polypropylene resin.

Also, in the case of the process (2), the modified polypropylene resin can be formed into foamed articles by melting the modified polypropylene resin in an extruder, feeding a volatile blowing agent under pressure into the extruder, kneading the molten modified polypropylene resin and the volatile blowing agent with maintaining at a high pressure, and discharging the sufficiently kneaded mixture of the modified polypropylene resin and the volatile blowing agent out of the die to form foamed articles. The melt-kneading temperature and time in this method is suitably selected according to the kind of the blowing agent and kneading conditions. The melt-kneading temperature and time, though varying depending on the kind of the resin, are usually from 130 to 300° C. and from 1 to 120 minutes, respectively.

From the viewpoints that lightness, heat insulating property, cushioning property against external stress or compression strength is good, it is preferable that the foamed articles of the present invention have a density of 0.01 to 0.5 g/cm$^3$, especially 0.015 to 0.2 g/cm$^3$.

Also, from the viewpoints of having a good heat insulating property, a good cushioning property against external stress and a good compression strength, it is preferable that the closed cell content in the foamed articles of the present invention is at least 50%, especially at least 70%.

In the process for the production of foamed articles of the present invention, the foamed articles to be produced may be in various shapes, e.g., sheet-like shape such as sheet or board, hollow shape such as tube or bag, columnar shape such as circular column, elliptical column, square column or strand, particulate shape, and the like.

The present invention is explained in detail below by means of examples, but is not limited to only these examples.

In the following Examples and Comparative Examples, the relationship between the elongational viscosity of modified polypropylene resins and polypropylene resins (non-modified polypropylene resins) measured in the molten state and the measuring time (amount of strain) was measured by the following method and calculated by the above-mentioned equation (1).

Pellets of the modified polypropylene resin or the polypropylene resin are charged in a capilograph provided with an orifice having a diameter of 3 mm, melted at 200° C. and extruded to give a strand-form sample having about 180 mm length. The relationship between the elongational viscosity and the measuring time (strain) is measured at 180° C. and a strain rate of 0.05/sec using the obtained sample by a Melten rheometer made by Toyo Seiki Kabushiki Kaisha. The elongational viscosity is obtained by dividing the stress ($\sigma$) by the rate of strain ($\gamma$) [a cross-sectional area of the sample which is measured by a charge coupled device (CCD)].

For example, in FIG. 1 (showing the relationship between the elongational viscosity of the modified polypropylene resin obtained in Example 1 described after and the measuring time), the elongational viscosity is increasing slowly up to about 10 seconds after starting the measurement, but thereafter increasing rapidly. The ratio of the gradient of a rapidly increasing portion of the elongational viscosity (gradient of a straight line drawn from the most rapidly increasing portion of the elongational viscosity with the lapse of time) to the gradient of a slowly increasing flat portion of the curve in the initial stage of the measurement (gradient of a straight line drawn from a relatively slowly increasing portion of the elongational viscosity with the lapse of time) is calculated (hereinafter the ratio may be referred to as "specific elongational viscosity ratio").

EXAMPLE 1

A blended of 100 parts by weight of a polypropylene homoipolymer (product of Sumitomo Chemical Company, Limited, NOBLEN D501, melt flow index 0.4 g/10 minutes at 230° C. ), 5 parts by weight of an isoprene monomer and 1 part by weight of $\alpha,\alpha'$-bis(t-butylperoxy-m-isopropyl)benzene (product of NOF Corporation, PERBUTYL P, one minute half-life temperature 175° C. ) was supplied to a twin-screw extruder (LABOTEX) made by the Japan Steel Works, Ltd. to give a modified polypropylene resin.

The twin screw extruder had two screws rotating in the same direction. The inner diameter of the cylinder was 32 mm $\phi$ and the maximum effective length (L/D) of the screw was 25.5. The heating was conducted with the cylinder temperature and the feed portion temperature of the twin screw extruder being set at 200° C. and 160° C., respectively. The rotation speed of each screw was set at 100 rpm.

The relationship between the elongational viscosity of the obtained modified polypropylene resin measured in the molten state and the measuring time (amount of strain) is shown in FIG. 1. The specific elongational viscosity ratio of the obtained modified polypropylene resin was 5.0.

EXAMPLES 2 to 7

Modified polypropylene resins were obtained in the same maner as in Example 1 except that the polypropylene resins, isoprene monomer and radical polymerization initiators shown in Table 1 were used in amounts shown in Table 1.

The specific elongational viscosity ratio of these modified polypropylene resins was measured in the same manner as in Example 1. The results are shown in Table 1.

TABLE 1

| Ex. No. | Polypropylene resin (part by weight) | Isoprene monomer (part by weight) | Radical polymerization initiator (part by weight) | Specific elongational viscosity ratio |
|---|---|---|---|---|
| 1 | Propylene homopolymer*[1] (100) | 5 | $\alpha,\alpha'$-bis(t-butylperoxy-m-isopropyl)benzene*[4] (1) | 5.0 |
| 2 | Propylene homopolymer*[1] (100) | 10 | $\alpha,\alpha'$-bis(t-butylperoxy-m-isopropyl)benzene*[4] (1.75) | 6.3 |
| 3 | Propylene homopolymer*[1] (100) | 30 | $\alpha,\alpha'$-bis(t-butylperoxy-m-isopropyl)benzene*[4] (4) | 7.8 |
| 4 | Propylene-ethylene random copolymer*[2] (100) | 10 | $\alpha,\alpha'$-bis(t-butylperoxy-m-isopropyl)benzene*[4] (1.75) | 6.5 |
| 5 | Propylene-ethylene block copolymer*[3] (100) | 10 | $\alpha,\alpha'$-bis(t-butylperoxy-m-isopropyl)benzene*[4] (1.75) | 6.8 |
| 6 | Propylene homopolymer*[1] (100) | 10 | 2,5-dimethyl-2,5-di(t-butylperoxy)hexyne-3*[5] (1.5) | 5.8 |
| 7 | Propylene homopolymer*[1] (100) | 10 | di-t-butylperoxide*[6] (1.5) | 6.5 |

*[1]Product of Sumitomo Chemical Company, Limited, NOBLEN D501, Melt flow index 0.4 g/10 minutes at 230° C.
*[2]Product of Mitsui Petrochemical Industries, Ltd., HIPOL B230, Melt flow index 0.5 g/10 minutes at 230° C.
*[3]Product of Mitsui Petrochemical Industries, Ltd., HIPOL B240, Melt flow index 0.5 g/10 minutes at 230° C.
*[4]Product of NOF Corporation, PERBUTYL P, 1 minute half-life temperature 175° C.
*[5]Product of NOF Corporation, PERHEXYNE 25B, 1 minute half-life temperature 194° C.
*[6]Product of NOF Corporation, PERBUTYL D, 1 minute half-life temperature 185° C.

Comparative Example 1

Figure 2:
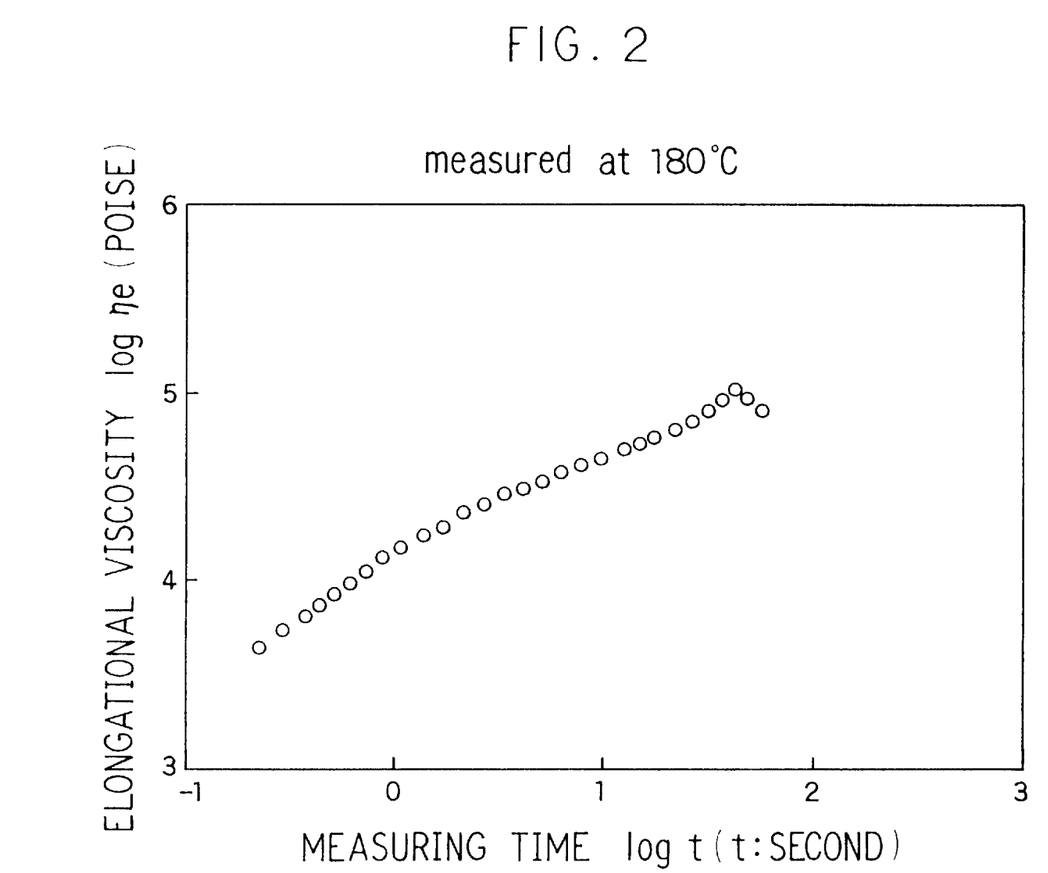
FIG. 2 is a graph showing a relationship between the elongational viscosity of the modified polypropylene resin of Comparative Example 1 measured in the molten state and the measuring time (strain).

The relationship between the elongational viscosity of a polypropylene homopolymer (product of Sumitomo Chemical Company, Limited, NOBLEN H501, melt flow index 3.5 g/10 minutes at 230° C. ) measured in the molten state and the amount of strain was obtained. The results are shown in FIG. 2.

Comparative Example 2

The procedure of Example 1 was repeated except that no isoprene monomer was used, in order to attempt to modify the polypropylene resin, but the melt viscosity was extremely lowered, so it was impossible to form into a strand.

EXAMPLE 8

In a twin-screw extruder (LABOTEX) made by the Japan Steel Works, Ltd. were melt-kneaded 100 parts by weight of a propylene homopolymer (product of Sumitomo Chemical Company, Limited, NOBLEN D501, melt flow index 0.4 g/10 minutes at 230° C. ), 5 parts by weight of an isoprene monomer and 1 part by weight of α,α'-bis(t-butylperoxy-m-isopropyl)benzene (product of NOF Corporation, PERBUTYL P, one minute half-life temperature 175° C. ). The mixture was melt-extruded to give a modified polypropylene resin molding in the form of a rod having a diameter of 4 mm. The rod was cut into pieces having a thickness of 3 mm to give pellets of the modified polypropylene resin.

The twin screw extruder had two screws rotating in the same direction. The inner diameter of the cylinder was 32 mm φ and the maximum effective length (L/D) of the screw was 25.5. The heating was conducted with the cylinder temperature and the feed portion temperature of the twin screw extruder being set at 200° C. and 160° C., respectively. The rotation speed of each screw was set at 100 rpm.

A foamed article in the form of round rod was prepared in the following manner by using the obtained pellets of modified polypropylene resin.

In a ribbon blender were mixed 100 parts by weight of the pellets of modified polypropylene resin, 0.05 part by weight of a blend oil (SUPEREASE available from Koshitani Kagaku Kogyo Kabushiki Kaisha) and 0.1 part by weight of a sodium bicarbonate-citric acid foaming neucleating agent (CELBONE SC/K available from Eiwa Kasei Kabushiki Kaisha) for 15 minutes. The mixture was fed to a tandem type extruder (diameters of cylinders of the first stage extruder and the second stage extruder were 40 mm φ and 50 mm φ, respectively). In the first stage extruder, the mixture was melted at 230° C., and then 8 parts by weight of a blowing agent, i.e. a butane gas (iso-rich butane gas; weight ratio of n-butane/isobutane 15:85) was pressure-fed per 100 parts by weight of the modified polypropylene resin followed by kneading, and then in the second stage extruder, the kneaded mixture was cooled so that the resin temperature would be 150° C. and extruded through a circular die having an olifice of 6 mmφ×25 mm to give a round rod foamed article.

The density, expansion ratio and closed cell content of the obtained round rod-like foamed article were evaluated in the following manners. The appearance was visually observed and evaluted according to the following criteria.

Density of foamed article:
  Calcualted from weight and volume measured by immersing in water Closed cell content:
  Measured using a multi-pycnometer (trade mark, product of Yuasa Ionics Kabushiki Kaisha) in accordance with ASTM D-2856

Evaluation criteria of appearance:
  ○: Non-foamed portion, fuzzing and wrinkling are not found.
  X: Non-foamed portion, fuzzing and wrinkling are found.

The density was 0.052 g/cm$^3$, the closed cell content was 78%, and the appearance was evaluated as ○.

EXAMPLES 9 to 14

Modified polypropylene resin pellets were obtained in the same manner as in Example 8 except that the kinds and amounts of the polypropylene resin, isoprene monomer and radical polymerization initiator were changed as shown in Table 2.

Round rod-like foamed articles were obtained in the same manner as in Example 8 by using the obtained modified polypropylene resin pellets.

The density, closed cell content and appearance of the obtained rod-like foamed articles were evaluated in the same manner as in Example 8.

Comparative Example 3

A round rod-like foamed article was prepared in accordance with the process in Example 8 except that a propylene homopolymer (product of Sumitomo Chemical Company, Limited, NOBLEN D501) was used without modifying it instead of the modified polypropylene resin pellets.

The density, closed cell content and appearance of the obtained rod-like foamed article were evaluated in the same manner as in Example 8.

Comparative Example 4

The melt-kneading was conducted in the same manner as in Example 8 except that the isoprene monomer was not used, but the melt viscosity was extremely lowered, so it was impossible to form into a strand.

With respect to Examples 8 to 14 and Comparative Examples 3 and 4, the modification conditions therein are shown in Table 2, and the physical properties (density, closed cell content and appearance) are shown in Table 3.

TABLE 3

| Ex. No. | Density (g/cm$^3$) | Closed cell content (%) | Appearance |
|---|---|---|---|
| 8 | 0.052 | 78 | ○ |
| 9 | 0.030 | 90 | ○ |
| 10 | 0.045 | 94 | ○ |
| 11 | 0.035 | 67 | ○ |
| 12 | 0.039 | 91 | ○ |
| 13 | 0.040 | 88 | ○ |
| 14 | 0.035 | 95 | ○ |
| Com. Ex. 3 | 0.280 | 18 | X |
| Com. Ex. 4 | —*1 | —*1 | —*1 |

*1 The resin obtained by melt-kneading was so low in viscosity as not to form into a strand, thus it was impossible to obtain foamed articles.

INDUSTRIAL APPLICABILITY

The modified polypropylene resins of the present invention have a high elongational viscosity in the molten state, so they are hard to cause draw-down. Therefore, the modified polypropylene resins of the present invention can be suitably used as materials of molded articles prepared using molding methods such as blow molding, extrusion coating, foaming and the like. Also, even in the case of using these molding methods, the molding conditions can be selected from wide ranges.

Also, the modified polypropylene resins have good properties such as chemical resistance, impact resistance, heat resistance and electrical insulating property.

Further, foamed articles having a low density, a high closed cell content, an excellent appearance and an excellent heat resistance are obtained by foaming the modified polypropylene resins.

We claim:

1. A process for preparing a modified polypropylene resin which comprises melt-kneading a polypropylene resin, an isoprene monomer and a radical polymerization initiator.

2. A modified polypropylene resin obtained by the process of claim 1.

3. The modified polypropylene resin of claim 2, which has the characteristics that the elongational viscosity measured in the molten state rapidly increases with increasing the strain.

4. A process for preparing a foamed article which comprises foaming the modified polypropylene resin of claim 2 or 3.

5. The process of claim 4, wherein the foaming is carried out by melt-kneading the modified polypropylene resin and a blowing agent, and extruding the resin.

6. A foamed article prepared by the process of claim 4.

7. A foamed article prepared by the process of claim 5.

* * * * *